Dec. 24, 1957   W. H. DEVONSHIRE ET AL   2,817,747
METHOD AND APPARATUS FOR ELECTRIC RESISTANCE WELDING
Filed April 19, 1955   2 Sheets-Sheet 1

WILLIAM H. DEVONSHIRE
THOMAS A. WILSON
HUMPHREY F. PARKER
INVENTORS

BY Bean, Brooks Buckley & Bean,
ATTORNEYS

Dec. 24, 1957  W. H. DEVONSHIRE ET AL  2,817,747
METHOD AND APPARATUS FOR ELECTRIC RESISTANCE WELDING
Filed April 19, 1955  2 Sheets-Sheet 2

WILLIAM H. DEVONSHIRE
THOMAS A. WILSON
HUMPHREY F. PARKER
INVENTORS

BY Bean, Brooks Buckley & Bean,
ATTORNEYS

United States Patent Office 2,817,747
Patented Dec. 24, 1957

2,817,747

METHOD AND APPARATUS FOR ELECTRIC RESISTANCE WELDING

William H. Devonshire, Williamsville, Thomas A. Wilson, Kenmore, and Humphrey F. Parker, Buffalo, N. Y., assignors to McKinnon Chain Corporation, Tonawanda, N. Y.

Application April 19, 1955, Serial No. 502,282

10 Claims. (Cl. 219—110)

This invention relates to the art of welding, and more particularly to a method and means useful in the resistance welding art for providing improved control of the welding temperature throughout each welding cycle in connection with an automatic welding operation.

It has long been recognized that in order to provide an optimum weld, the temperature must be precisely controlled throughout the welding operation; but it has been difficult to provide a practicable method and means for so controlling the welding temperature throughout the welding cycle especially when working with certain types of work pieces. Thus, attempts have previously been made to regulate the welding current during the welding cycle with a view to providing a correspondingly controlled temperature at the welding zone; but it has been found by experience that such devices are often ineffective for the intended purpose because the temperature at the welding zone does not always fluctuate as a predetermined function of the welding current applied to the work.

To avoid the difficulties and disadvantages of the aforesaid prior methods, the present invention contemplates prescribing an optimum temperature fluctuation pattern throughout the welding cycle (which has been determined empirically to provide an optimum weld for given work pieces), and a welding current control system which is precisely responsive to the actual temperature conditions in the welding zone to obtain the prescribed temperature pattern. More specifically, the invention contemplates employment of pyrometer means receptive only to radiation from the actual welding zone itself and operable in combination with a novel and improved electrical control system for the welding current supply. Thus, it is a primary object of the present invention to provide an improved welding current control device which is operable automatically with extreme sensitivity in response to any deviation of the actual welding temperature from the prescribed and desired pattern thereof, so as to regulate the welding current to compensate instantaneously for any undesired deviation, regardless of the cause thereof. Thus, the present invention distinguishes from such prior systems as involve, for example, the use of conventional voltage regulator devices or the like, which operate on the impractical theory that welding temperatures may be variably controlled by sensing corresponding variations of the welding current.

Another object of the invention is to provide an improved welding current control mechanism as aforesaid, which is relatively simple, mechanically and electronically; relatively inexpensive to build and maintain; and which is fool-proof in operation. Other objects and advantages of the invention will appear from the following detailed specification dealing with preferred apparatus and procedure for practicing the invention.

Figure 1:
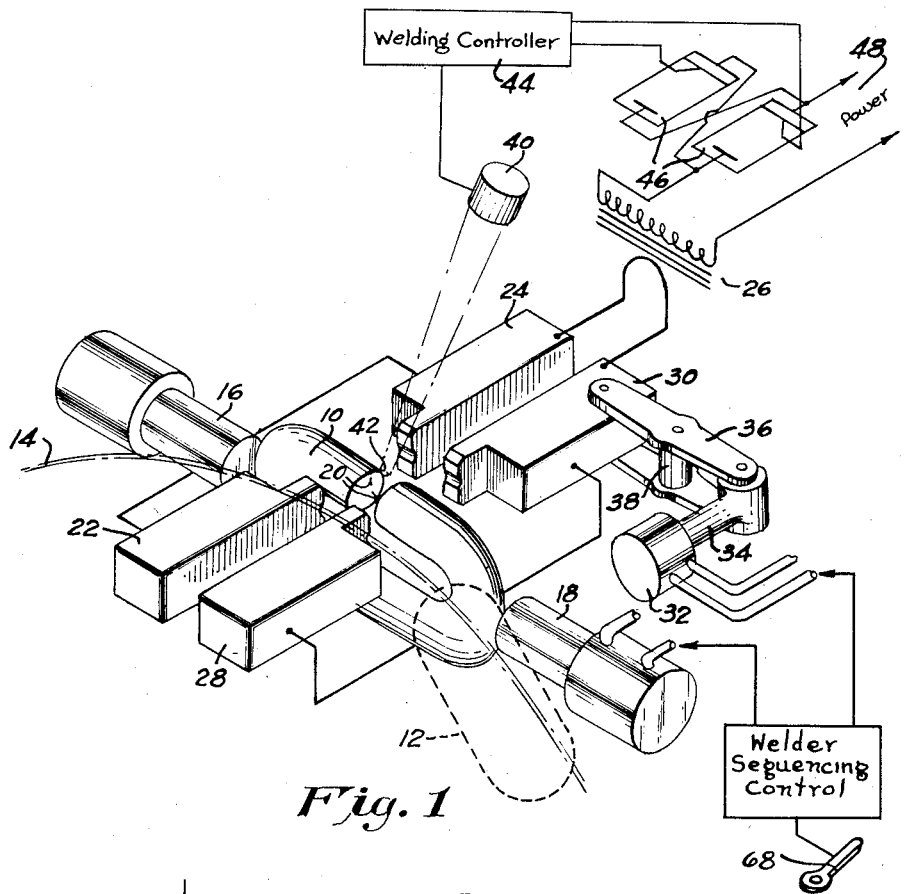
Fig. 1 is a schematic perspective view of those portions of an exemplary chain welding machine essential to an understanding of the invention.

Before proceeding to the detailed description of the present invention, its importance as a solution of certain problems of the art will be recapitulated by comparison with prior suggestions for the control of resistance welding operations. As has been stated, the attempt to correlate weld temperature with the applied electrical current has not yielded good results, because small dimensional deviations, and even unavoidable variations in the composition of the workpiece, produce fluctuations in temperature at the weld area, even for closely regulated current values. In resistance welding especially, the nature of the contact between the faces being joined has a profound effect on the rate at which the temperature rises when heating commences; since even pieces of similar dimensions almost never have a similar degree of flatness at the weld interface, temperature variations are common. For high quality welds and good uniformity between successive welds, it is desirable not only to attain a certain ultimate temperature, but also to govern the rise of the temperature during the weld cycle; in short, to cause the temperature to follow a preselected "target" or pattern of temperature against time. The present invention satisfies this need in a simple and efficient manner, and with a precision not heretofore obtainable.

Additionally, the invention provides for the ready interchange of different patterns, which is highly advantageous when the nature of the work being welded changes from time to time. This flexibility is obtained without any mechanical complication in the basic welding machine.

Because good control and a high uniformity of successive welds are of particular importance in the manufacture of welded chain, the invention is principally described herein in connection with such a procedure; however, it is to be understood that the methods and equipment so described can readily be applied to the making of other resistance or electric welded products, and the invention is to be understood as including such other applications.

The invention, in its broader aspect, contemplates continuously or substantially continuously, sensing the actual temperature of a workpiece at or near the weld interface or region, and continuously and substantially instantaneously controlling the applied current in the appropriate direction (increase or decrease) to cause the sensed temperature to equal, at each instant, the temperature called for by a predesigned pattern, schedule or target. To this end, the procedure continuously senses the weld temperature and compares this information with the temperature called for by the pattern. If any sensible discrepancy occurs, the invention immediately alters the current supply (by altering the welding voltage) in the direction necessary to restore the condition of equality. In other words, information as to the degree to which the current supply is producing the desired temperature changes is fed back to the current supply controller to achieve a self-correcting effect.

The satisfactory accomplishment of the above requires a sensing device which has a fast response and which is rugged and accurate under varying and adverse environmental conditions. For these and other reasons, the invention comprehends the sensing of workpiece temperature in terms of the infra-red radiance of the hot surface of the workpiece. This avoids the usual thermal delays involved with thermocouples, resistance thermometers and the like. Additionally, since the radiance can be measured accurately, from a reasonable distance, this facilitates application to existing machinery with a minimum of modification, and permits removal of the sensing element itself to a location where it and its connections are relatively free from high temperatures and from the disturbing effects of the intense magnetic field produced by the heavy currents flowing in the work circuit and its conductors.

Suitable infra-red sensing devices include photocells, with or without appropriate rayfilters, temperature sensitive resistors (varistors) or the like, bolometers and thermopiles, and others.

With the above considerations in mind, a preferred form of the invention will now be described. Referring to Fig. 1 of the appended drawings, the essential parts of a conventional chain welder are shown in their relationship to a single link 10 shown in open condition as it arrives at the welding station. Those familiar with this art will understand that a continuous succession of such links arrive in turn at the welding station, the links being hooked together in a continuous chain at a previous station. The position of a second link hooked to link 10 is indicated at 12 in dash lines, the successive (or rather, alternate) links being brought to welding position by rotation of a sprocket over which they are engaged. The sprocket (partially indicated by dot-dash lines at 14) is rotated intermittently, and the welding operations are synchronized to this rotation in a well-known manner. The intermediate links (such as 12) which do not stand in a suitable position for welding at this station, are usually welded at a following station duplicating that shown.

When link 10 arrives at the position of Fig. 1, it pauses and rams 16, 18 are moved towards one another to close the link and to abut its end faces 20. As or after this occurs, the link material to each side of the butting faces is engaged by respective pairs of electrodes, one pair consisting of electrodes 22 and 24 connected to one side of the secondary winding of welding transformer 26, and the other pair being numbered 28 and 30 and connected to the other side of the secondary. The electrodes forming each pair or guided for movement toward and away from one another, to engage the sides of the link adjacent the butt in an opposed fashion which will hold it firmly in place and with good contact pressure.

Suitable means for moving the electrodes is illustrated in Fig. 1 as a pneumatic or hydraulic cylinder 32 whose ram or piston 34 rotates a linkage 36 pivoted at 38 and connected to electrode 30 by pivotal means. Duplicate or ganged drives are provided for the other electrodes, these being omitted for clarity; while the rams 16, 18, and the electrodes are shown as operated pneumatically or hydraulically in Fig. 1, it is obvious that mechanical links or cams could equally well be employed. In any case, the rams and electrodes are operated in properly timed sequence in the usual manner of these machines: the welder sequencing control is schematically indicated in Fig. 1 by a block so labeled.

In order to control the weld temperature, the invention provides the sensing device 40 arranged to receive from an area at or adjacent the weld zone (the spot is indicated at 42, by way of illustration), and the output of device 40 is used to determine the deviation of the temperature (if any) of the weld zone from that called for by the pattern. In Fig. 1, the control of welding current is generally achieved by the apparatus represented by block 44, whose output controls the firing phase of reverse-parallel ignitrons 46 connected between the primary winding of transformer 26 and the normal supply line 48. The details of this ignitron circuit are not shown herein, since they may take different forms and since their manner of functioning is well known.

Figure 2:
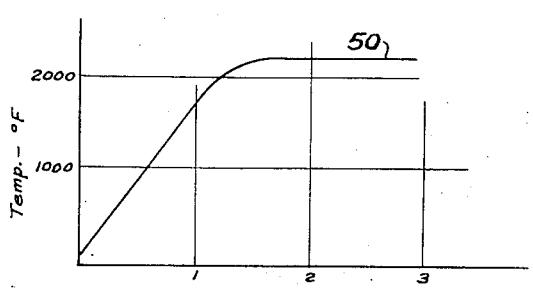
Fig. 2 is a graphical representation of a typical desired relationship between the temperature at the weld area and the time during which welding current flows.

Fig. 2 shows graphically one typical form which the target graph may take. Curve 50 represents the desired temperature at or near the weld in terms of the time elapsed after welding current commenced to flow. The temperature is desired to rise approximately linearly to a value of approximately 2150° F. in some prescribed time depending upon the type of material and the size stock being welded.

Figure 3:
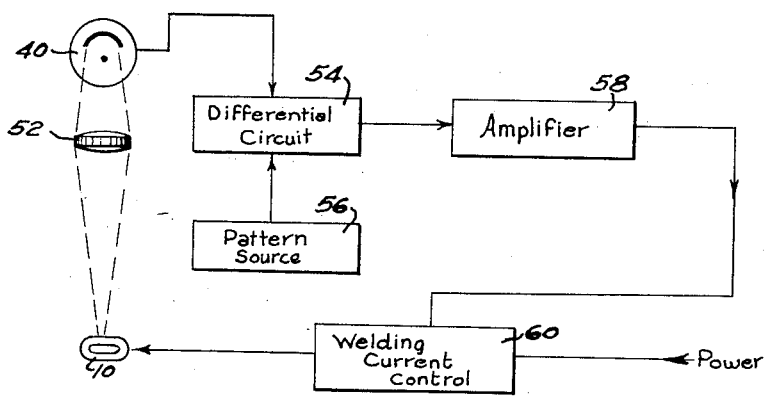
Fig. 3 is a schematic flow diagram of the essential circuitry of the invention.

In order to permit the apparatus to compare the temperature at all times with the target, the information defined by curve 50 is put into the machine in a manner such as described below. Referring first to Fig. 3, however, a simple showing of the complete electrical system of Fig. 1 is shown. In Fig. 3, the link being welded is again denoted by numeral 10, and the infra-red radiation sensing device by 40, there being shown in this instance a lens 52 representing an optical system for defining the area of the welding zone from which radiation is to be detected. The sensing device is shown as connected to furnish its information (a current, voltage or perhaps an impedance or resistance variation, depending upon the specific nature of the device 40) to a combining circuit 54 which actually computes the difference, if any, between this information and that furnished by the pattern source 56. The latter will be referred to in more detail below, but for the purposes of the present description may be thought of as supplying to the differential or combining circuit a voltage, current or other information signal which varies from instant to instant, after initiation of a weld cycle, in accordance with the desired variation in weld or workpiece temperature; in short, a signal which corresponds to the curve 50 of Fig. 2 or a variant thereof.

Differential circuit 54 effects a comparison of these two pieces of information, from instant to instant, and provides an output which is a function of the difference or mis-match between such information from the sources 40 and 56. This output, which is zero when the workpiece temperature (at the sensed region) equals that called for by the target pattern, or is within an allowable tolerance, is applied to the input of an amplifier 58, whose output in turn is applied to the welding current controller 60. In this way, the main welding power source, indicated as a conventional electric supply main, is controlled to alter the welding current in the direction necessary to bring the workpiece temperature into substantial agreement with that called for by the pattern. In short, the apparatus develops what may be termed an "error" signal which is utilized to control the welding current, and since this error signal depends only on the temperature of the workpiece and the desired temperature, ordinary principles of information feedback operate to maintain the desired welding temperature at all times. This is true regardless, for example, of reasonable variations in the mains supply voltage, the condition or composition of the workpiece, room temperature and other conditions. It is also true regardless of the precise degree of pressure applied by the rams of Fig. 1 to the workpiece, and this feature therefore eliminates a prime objection to the attempted control of welding temperature by sensing the welding current, because the latter ordinarily depends in an important way upon the resistance of the interface region at which the ends of a chain link abut, and indeed upon the effective resistance between separate workpieces in other types of welding operations.

Figure 4:
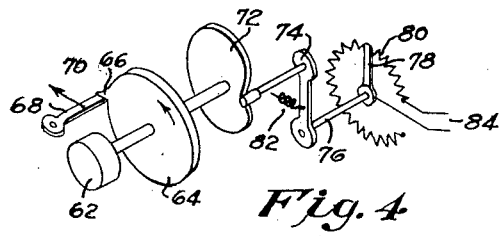
Fig. 4 is a fragmentary perspective view of one form of welding pattern generator useful with the invention.

Turning now to Fig. 4 of the drawings, there is illustrated one exemplary and preferred manner of generating the pattern information, in particular one way in which such information may be obtained as a variation in a resistance value with time. In that figure, a timer motor 62 is shown as driving a disc 64 provided with a stop lug or projection 66 which holds the disc against rotation by reason of a movable stop 68 arranged to be drawn aside the instant the initiation of a welding cycle is accomplished. As has been indicated, this instant will ordinarily be determined by the condition of the chain link advancing sprocket or other welding-cycle sequence control, as indicated in Fig. 1, being the same as that which provides for timed operation of the rams and other parts of the conventional welding machine. A slip clutch may be provided between motor 62 and disc 64 if necessary to obviate damage to the motor when disc 64 is held stationary, as in conventional timer practice. When the stop 68 is withdrawn, as by force transmitted through the connection 70 to the machine cycle control, disc 64 starts to turn at a fixed speed, and through a connecting shaft rotates a cam 72 which alters the position of a follower arm 74 fixed upon a shaft 76 which controls the position of the wiper 78 of a potentiometer or variable resistor 80. A spring 82 urges the follower roller against the cam surface, so that wiper 78 faithfully responds to all variations in the instantaneous cam radius. Hence, the resistance provided at terminals 84 of the resistance represents the predetermined temperature sequence desired for the particular kind of welding operation in hand. Recycling of the timer drive is accomplished in any desired or known manner omitted herein for clarity.

It is clear that if a varying voltage is desired as the pattern signal, such can readily be obtained by connecting a battery or other current source across the ends of the potentiometer winding, to provide at the leads 84 a voltage variation following the cam contour. Also, it is apparent that when the pattern of desired temperature sequences is to be altered, all that is necessary is to replace cam 72 with another of appropriate configuration, the rest of the system being unaltered. Since the pattern signal generator (and indeed most of the components of the control apparatus) may be located relatively remote from the actual welder, this change is accomplished with great ease.

An alternative form of pattern generator which suggests itself is the use of a potentiometer with a special or non-linear winding whose resistance varies with the wiper rotation in a manner corresponding to the desired pattern, in which case cam 72 is not needed. Other variable voltage sources and the like, such as variable transformers or condensers, can also be substituted without significant change in the other components of the system being described.

Figure 5:
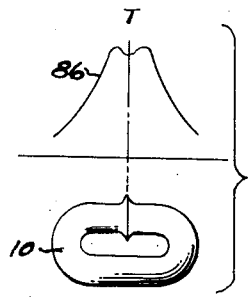
Fig. 5 is a graphical showing of the variation in temperature at different locations in the areas of a workpiece undergoing welding.

So far, no consideration has been given to the selection of the particular region of the welding zone which is "looked at" by the radiation sensing device. Some variation is possible as to this factor, in that for certain purposes it may be desired to control the temperature directly upon the weld junction area, while for others the temperature at a point somewhat displaced may be more significant. Since the selected point can readily be obtained merely by altering the optical axis of the sensing device and any lenses or the like associated therewith, the desired region may readily be obtained. Moreover, control of the optical parameters enables the user to determine the size of the area being inspected or sensed. As shown at curve 86 in Fig. 5, which is a graph of the temperature during welding along the welded portion of a chain link, the temperature may be at its maximum slightly to either side of the weld plane, with a slight dip directly on that plane, due to various factors including the fact that the radiation at the weld plane is not perfectly normal or perpendicular to the general surface of the link as a result of the upsetting of the link material adjacent the interface. Also, particles of oxide or the like squeezed out of the interface may alter the radiance at that area. It is perfectly feasible to adjust the size and location of the area being sensed so that radiation from an area encompassing the entire welded zone is received, in which case, the temperature variation across the interface will be averaged out.

Figure 6:
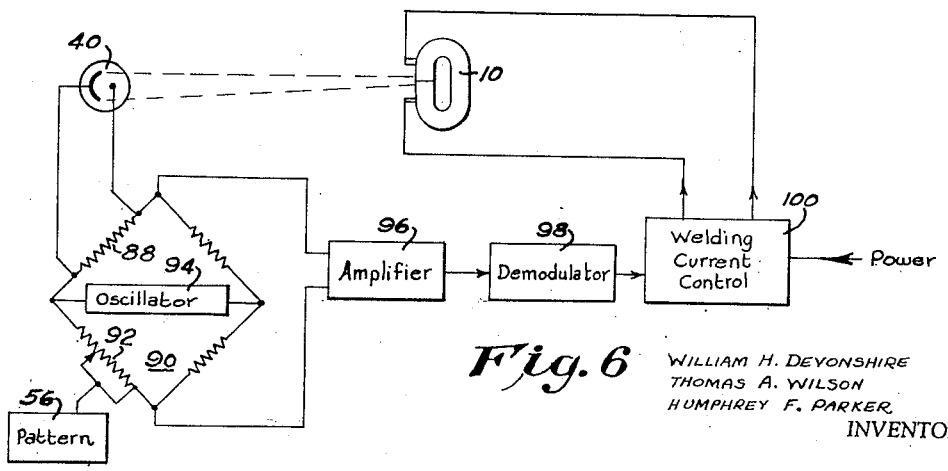
Fig. 6 is a view similar to Fig. 3 of a more refined arrangement for practicing the invention.

A somewhat refined modification of the circuitry is illustrated by the Fig. 6 schematic, which utilizes a modulated carrier for impressing the differential information upon the amplifier, for greater stability and simplification of the amplifier design. In this instance, the sensing device 40 may be of any of the types indicated above, and is represented as a variable resistance device connected in shunt to a resistor 88 forming one leg of a bridge 90. The pattern signal (herein again a resistance variation) from generator 56 is applied to shunt to a different resistor leg 92 of the bridge, and across one diagonal is applied a fixed audio frequency carrier wave source such as the oscillator 94. The opposite diagonal develops between its terminals an alternating voltage which is a function of the bridge unbalance, or the difference between the sources of input information just described. This alternating current "error" signal is applied to an A. C. amplifier 96 and the amplified output is demodulated as at 98 to convert the signal to a direct current voltage suitable for direct control of the grid-controlled rectifiers supplying the welder transformer primary; as before, the welding current control 100 may be of other types such as a controlled transformer, saturable device or other form of heavy current regulator.

The balanced bridge and carrier technique just described permits all of the amplification to be performed upon an alternating voltage of fixed frequency, which permits amplifier simplification since direct current amplifiers of adequate sensitivity and stability are comparatively complex. It is to be understood that the bridge circuit 90 of Fig. 6 may be representative of the generalized differential circuit 54 of Fig. 3, and of course that equivalent differential sensing circuits or subtracting circuits may be substituted if desired.

From the above description of exemplary embodiments of the system and apparatus, and the procedures employed in practicing the invention, it will be realized that the basic feature of the invention is the control of welder current by a system including a feedback path which modulates the current in accordance with instantaneous readings of the deviation of the weld workpiece temperature (as reflected by its infra-red radiance) to reduce this deviation as close to zero as is practicable or tolerable. While it has been proposed to utilize the heat radiation from a weld zone to control the shutting off of the welding current, and it has also been proposed to modulate the welding current from time to time in accordance with a desired schedule, the present invention for the first time provides an integrated system in which any desired welding schedule may be caused to be closely followed regardless of substantial variations in the nature of the work, the supply voltage, reasonable variations in components of the control system and other factors which seriously and adversely affect the quality of successive welds made under the prior proposals.

While the invention has been described and illustrated in connection with certain specific examples, it is to be understood that these are exemplary and not exhaustive, and that the invention is not to be construed as limited to any particular details of the disclosure except insofar as required by the scope of the appended claims.

We claim:

1. In a resistance welding machine of the type having a source of welding current and grid-controlled discharge device means for regulating the effective magnitude of said current, the improvement which comprises means for generating a pattern signal representing a desired temporal variation in the temperature of material being welded, means responsive to the radiance of material being welded for generating a signal representative of the instantaneous temperature of said material due to the passage of welding current therethrough, and means responsive to the instantaneous difference in magnitude of said signals for controlling said discharge device means.

2. In a resistance welding machine of the type having a source of welding current and means for regulating the effective magnitude of said current, the improvement which comprises means for generating a pattern signal representing a desired temporal variation in the temperature of material being welded, means responsive to the radiance of material being welded for generating a signal representative of the instantaneous temperature of said material due to the passage of welding current therethrough, and means responsive to the instantaneous difference in the magnitude of said signals for controlling said regulating means.

3. A resistance welding machine in accordance with claim 2 including cyclically operable pressure devices, and means for synchronizing said pattern generating means with the operation of said pressure devices.

4. A resistance welding machine in accordance with claim 2, in which said pattern generating means comprises a variable resistance element and cam means for varying the instantaneous resistance of said element.

5. A resistance welding machine in accordance with claim 2, in which said radiance responsive means is selectively responsive to the infra-red radiation from the material being welded.

6. A resistance welding machine in accordance with claim 2, in which said radiance responsive means is selectively responsive to the radiation from a selected small portion of the surface of the material being welded.

7. In a resistance welding apparatus, welding current supply means comprising welding sequence control means adapted to initiate and terminate operation of said supply means and welding current amplitude control means, said amplitude control means comprising detector means adapted and arranged to sense heat energy radiated by the weld bone of the work and responsive thereto to vary a first electrical quantity, pattern generating means operative to vary a second electrical quantity in accordance with a predetermined time varying pattern, said pattern generating means being responsive to said sequence control means for synchronization therewith, comparison circuit means operative to compare said first and second quantities and adapted to provide an error signal output in accordance with the difference therebetween, amplifier means responsive to said error signal for amplifying the same, and means responsive to the amplified error signal operative to vary the amplitude of the welding current.

8. Process of electrical resistance welding comprising the steps of passing electric current through a workpiece to be welded, generating a pattern signal which varies with time in accordance with the desired temperature fluctuations in said workpiece, measuring the radiant energy emitted by said workpiece, and altering the flow of welding current through said workpiece in accordance with the difference between said pattern signal and a function of the measured radiance, in such a manner as to maintain equality between the temperature called for by said pattern signal and the temperature of said workpiece.

9. Process of electrical resistance welding comprising the steps of passing electric current through a workpiece to be welded, generating a pattern signal which varies with time in accordance with the desired temperature fluctuations in said workpiece, continuously measuring the radiant energy emitted by said workpiece, and altering the flow of welding current through said workpiece in accordance with the instantaneous difference between said pattern signal and a function of the measured radiance, in such a manner as to maintain equality between the temperature called for by said pattern signal and the temperature of said workpiece.

10. Process of electrical resistance welding comprising the steps of passing electric current through a workpiece to be welded, generating a pattern signal which varies with time in accordance with the desired temperature fluctuations in said workpiece, measuring the radiant energy emitted by a selected surface portion of said workpiece, and altering the flow of welding current through said workpiece in accordnace with the instantaneous difference between said pattern signal and a function of the measured radiance, in such a manner as to maintain equality between the temperature called for by said pattern signal and the temperature of said workpiece.

References Cited in the file of this patent

UNITED STATES PATENTS

| 1,975,753 | Delano et al. | Oct. 2, 1934 |
| 2,224,733 | Konig et al. | Dec. 10, 1940 |
| 2,233,617 | Lamb | Mar. 4, 1941 |
| 2,264,175 | Dawson | Nov. 25, 1941 |

FOREIGN PATENTS

| 1,020,740 | France | Mar. 19, 1952 |

UNITED STATES PATENT OFFICE
CERTIFICATE OF CORRECTION

Patent No. 2,817,747                      December 24, 1957

William H. Devonshire et al.

It is hereby certified that error appears in the above numbered patent requiring correction and that the said Letters Patent should read as corrected below.

In the grant, lines 3 and 13, and in the heading to the printed specification, line 6, name of assignee, for "McKinnon Chain Corporation", each occurrence, read --Columbus McKinnon Chain Corporation--.

Signed and sealed this 18th day of February 1958.

(SEAL)
Attest:
KARL H. AXLINE
Attesting Officer

ROBERT C. WATSON
Commissioner of Patents